E. ODELL.
FORCEPS.
APPLICATION FILED JUNE 27, 1919.
1,322,606.
Patented Nov. 25, 1919.
2 SHEETS—SHEET 1.
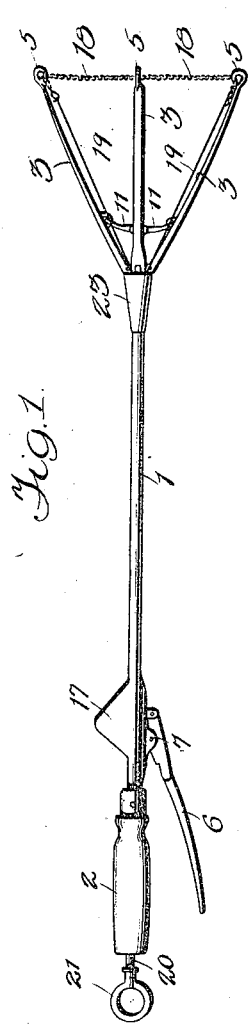
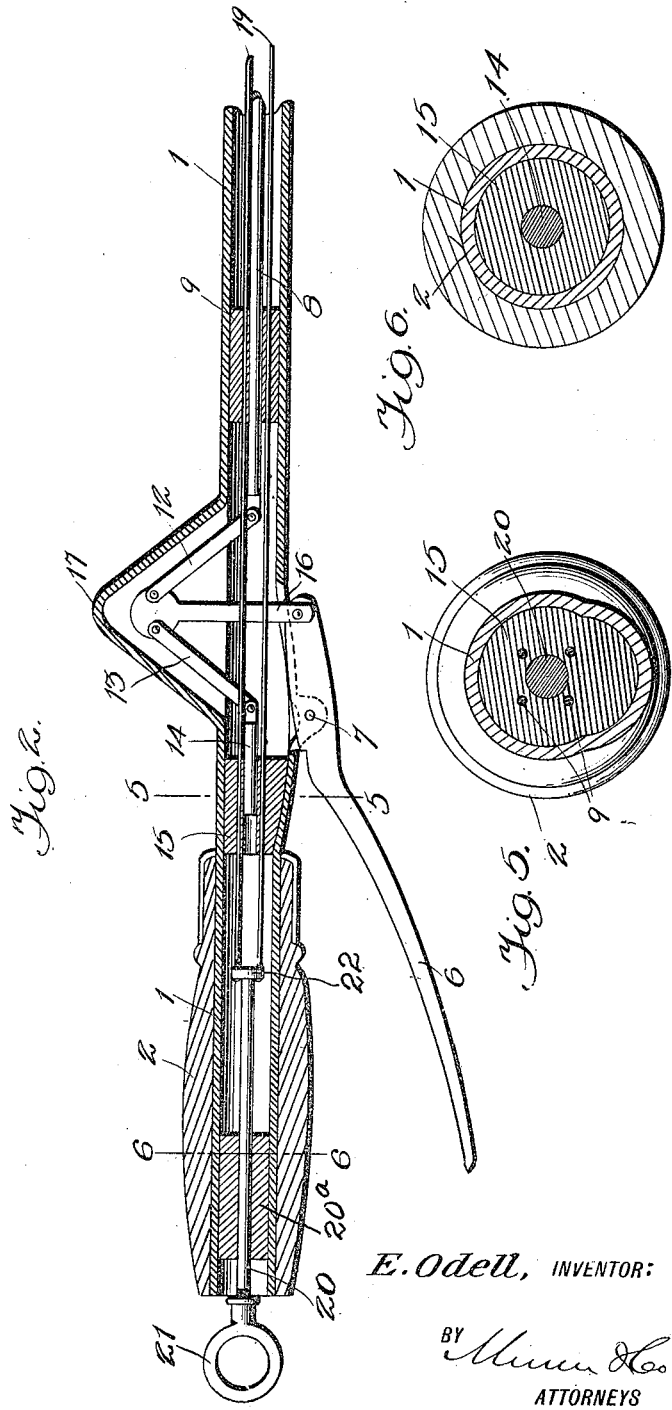
WITNESSES
E. Odell, INVENTOR:
ATTORNEYS

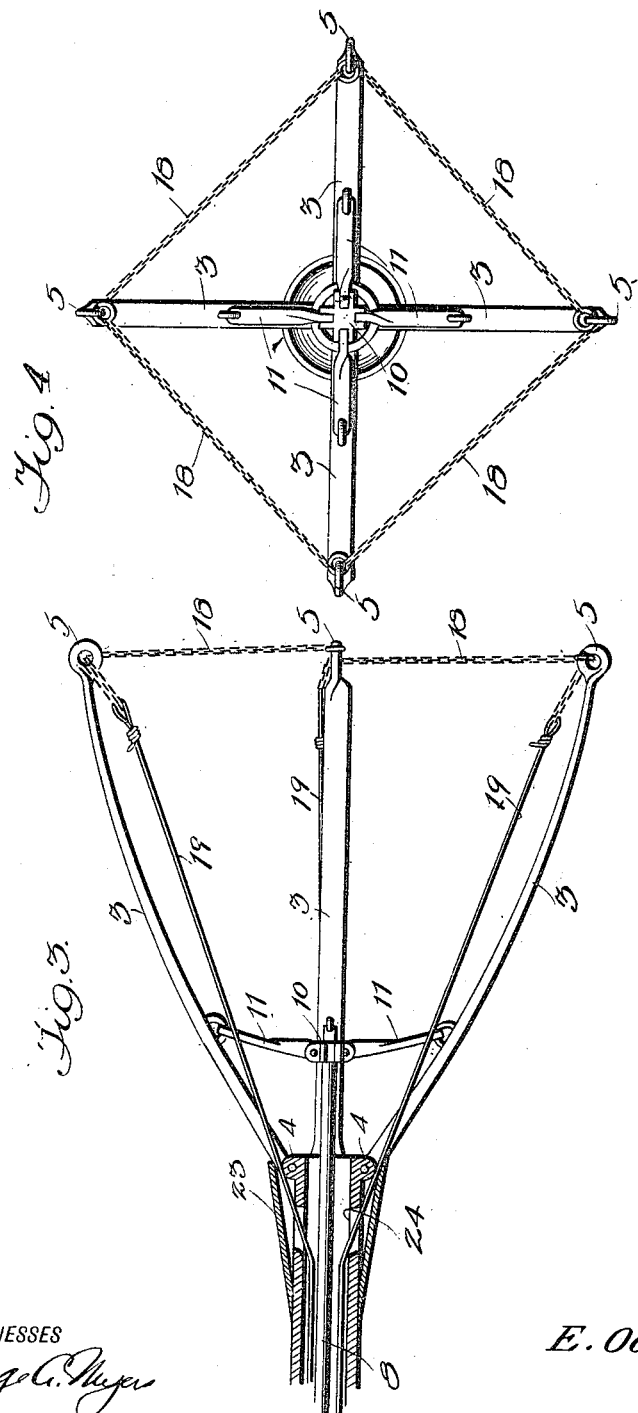

UNITED STATES PATENT OFFICE.

EDWIN ODELL, OF CENTRAL CITY, NEBRASKA.

FORCEPS.

1,322,606.  Specification of Letters Patent.  Patented Nov. 25, 1919.

Application filed June 27, 1919. Serial No. 307,168.

*To all whom it may concern:*

Be it known that I, EDWIN ODELL, a citizen of the United States, and a resident of Central City, in the county of Merrick and State of Nebraska, have invented certain new and useful Improvements in Forceps, of which the following is a specification.

My invention is an improvement in forceps and has for its object to provide an instrument of the character specified, especially adapted for the use of veterinary surgeons, as obstetrical forceps, wherein a series of blades is provided, mounted to move toward and from each other, but without touching at their edges, and flexible means in connection with the blades, and mounted in a plane transverse to the axis about which the blades are grouped, for gripping the object to be removed, the flexible means being controlled to grip in coöperation with the closing movement of the blades.

In the drawings:

Figure 1 is a plan view of the improved forceps,

Fig. 2 is a partial longitudinal section showing the operating mechanism,

Fig. 3 is a partial side view with parts in section, and the blades open,

Fig. 4 is an end view looking at the open edge blades,

Figs. 5 and 6 are sections on the lines 5—5 and 6—6, of Fig. 2.

In the present embodiment of the invention, a handle or shank portion 1 is provided, the said handle being hollow, leaving at one end a grip 2, and at the other a series of blades 3 is pivoted or hinged to one end of the handle as indicated at 3. These blades are shown as slightly curved longitudinally, and are arranged with their convex faces outward. They are so shaped and mounted that they cannot touch at their adjacent edges, and hence cannot grip the mucous membrane of the mother, when they are closed.

These blades are pivoted between ears 4 on the shank and each has an eye 5 at its outer end. The blades are moved toward and from each other, by means of a lever which is pivoted to the shank at the grip, as indicated at 7, and the shank has a longitudinally extending slot at the lever.

A rod 8 is mounted to slide in the shank, being guided by bushings 9 held in the bore of the shank, and the rod extends out of the shank at the end adjacent to the blades.

A collar 10 is mounted on the rod at the end, and the collar has radial lugs, to which are pivoted the inner ends of stretchers 11, whose outer ends are pivoted to the blades. The rod at the end adjacent to the lever is pivoted to one of the members 12 of a toggle assembly, the other member 13 of the assembly being pivoted to a fixed member 14, held in a bushing 15 in the shank. A link 16 connects the lever 6 with the adjacent ends of the levers 12 and 13, the said link having a head to which the levers are pivoted.

It will be evident that when the lever is swung, the link 16 will be moved transversely of the shank, and will swing the toggle to cause the rod 8 to move longitudinally. When the rod is so moved the blades will be moved toward and from each other, through the stretcher connection.

The blades are relatively narrow and are hinged at points sufficiently far apart, so that they cannot abut at their adjacent edges when they are closed. The eye 5 and curve of the blade assist in holding the adjacent blade edges spaced. It will be noticed that the toggle assembly is arranged in an extension 17 from the shank.

Flexible members 18, chains in the present instance, are connected to each blade, and each of these chains is slidable through the eye of the adjacent blade. Thus the flexible members are supported by the blades in a plane substantially at right angles to the axis about which the blades are grouped, in a loop, which may be opened and closed.

That end of each chain remote from the eye connection is secured to one end of a semi-rigid member 19, a wire for instance, and these wires pass through the hollow shank to a connection with a controlling rod 20, mounted to slide in a bushing $20^a$, in the hollow shank, at the end remote from the blades.

The rod has an eye 21 at its outer end, and a head 22 at its inner end, to which the wires are connected, and the bushings 9 and 15 have longitudinally extending openings through which the wires pass. The shank has a flaring extension at the end adjacent to the blades, through whose large end the wires enter and pass through slots 24 in the shank to the bore thereof, the slots being within the extension.

In operation, the forceps are introduced into the womb, in closed condition. As soon as the end with the blades touches a pig, for instance the blades are opened. The opening of the blades serves a double purpose, not only permitting the blades to be slipped over the animal, but also acting as a speculum, to permit the operator to see what he is doing. An electric light may be arranged on the shank at the blades if desired.

With some slight manipulation, the animal or a portion thereof may be brought through the open loop or noose, formed by the flexible member, it being understood that the opening of the blades opens and spreads this noose. As soon as the animal is within or partly within the noose, the rod 20 is pulled to tighten the noose or loop on the animal.

This movement not only tautens the flexible members, but acts to draw the blades together, and the pig is tightly grasped by the flexible members and may be easily removed. It is impossible to grip any portion of the mother, since the blades never abut at their edges, and the tautening of the flexible members tends to clear them from the tissues of the mother.

It will be evident from the description that the flexible members constitute a noose, which may be engaged about the object and tightened thereon, the blades, the shank and associated parts constituting means for introducing the noose, for opening and supporting it in a plane transverse to the axis of the shank, and for tightening the noose on the object.

I claim:

1. Forceps of the character specified, comprising a series of blades hinged at one end to swing toward and from each other at their free ends, a flexible member secured at one end to each blade and slidably connected to an adjacent blade, a handle member to which the blades are hinged, a rod slidable in the handle and connected to the blades for swinging the same, a lever pivoted to the handle for operating the rod, a second rod slidable in the handle and semi-rigid connections between the last named rod and the flexible members.

2. Forceps of the character specified, comprising a series of blades hinged at one end to swing toward and from each other at their free ends, a flexible member secured at one end to each blade, and slidably connected to an adjacent blade, means for swinging the blades and means for tensioning the flexible members.

3. Forceps of the character specified, comprising a series of blades hinged at one end to swing toward and from each other at their free ends, a flexible member secured at one end to each blade and slidably connected to an adjacent blade, means for swinging the blades, means for tensioning the flexible members, and a handle member to which the blades are hinged.

4. Forceps of the character specified, comprising a series of blades hinged at one end to swing toward and from each other at their free ends, a flexible member secured at one end to each blade and slidably connected at an adjacent blade, a handle member to which the blades are hinged, a rod slidable in the handle and connected to the blades for swinging the same, and a lever pivoted to the handle for operating the rod.

EDWIN ODELL.